United States Patent
Yan et al.

(10) Patent No.: US 9,822,499 B2
(45) Date of Patent: Nov. 21, 2017

(54) EPOXY MORTAR ADAPTED IN BRIDGE EXPANSION JOINT AND CONSTRUCTION METHOD THEREOF

(71) Applicant: Heeron Tech(Wuhan)New Materials Co.,Ltd., Wuhan, Hubei (CN)

(72) Inventors: Wen Yan, Hubei (CN); Silong Zheng, Hubei (CN); Mulin Yan, Hubei (CN); Li Xu, Hubei (CN)

(73) Assignee: Heeron Tech (Wuhan) New Materials Co., Ltd., Wuhan, Hubei (CN)

( * ) Notice: Subject to any disclaimer, the term of this patent is extended or adjusted under 35 U.S.C. 154(b) by 0 days.

(21) Appl. No.: 15/294,652

(22) Filed: Dec. 23, 2016

(65) Prior Publication Data

US 2017/0121918 A1    May 4, 2017

(51) Int. Cl.
| | |
|---|---|
| *E01D 19/06* | (2006.01) |
| *C04B 14/36* | (2006.01) |
| *C04B 18/14* | (2006.01) |
| *C04B 26/14* | (2006.01) |
| *E01D 21/00* | (2006.01) |
| *C04B 103/10* | (2006.01) |
| *C04B 103/00* | (2006.01) |
| *C04B 111/72* | (2006.01) |

(52) U.S. Cl.
CPC ............. *E01D 19/06* (2013.01); *C04B 14/36* (2013.01); *C04B 18/141* (2013.01); *C04B 26/14* (2013.01); *E01D 21/00* (2013.01); *C04B 2103/0043* (2013.01); *C04B 2103/10* (2013.01); *C04B 2111/72* (2013.01); *Y02W 30/94* (2015.05)

(58) Field of Classification Search
CPC ......... E01D 19/06; E01D 21/00; C04B 14/36; C04B 18/141; C04B 26/14; C04B 2103/10
USPC ................. 14/73.1–74, 77.1; 404/47, 49
See application file for complete search history.

(56) References Cited

U.S. PATENT DOCUMENTS

| | | | | |
|---|---|---|---|---|
| 3,234,860 A | * | 2/1966 | Gordon ................ | E01C 11/106 404/65 |
| 4,285,612 A | * | 8/1981 | Betti ..................... | E01C 11/04 14/73.1 |
| 4,784,516 A | * | 11/1988 | Cox ...................... | E01C 11/10 14/73.1 |
| 5,024,554 A | * | 6/1991 | Benneyworth ....... | E01D 19/067 404/47 |
| 5,333,432 A | * | 8/1994 | Schluter ............ | E04F 15/02027 404/64 |

(Continued)

*Primary Examiner* — Raymond W Addie

(57) ABSTRACT

An epoxy mortar material for a bridge expansion joint structure and a construction method. The epoxy mortar material includes a liquid A, a liquid B and a filler, wherein diamines D2000 and D230 are mixed to act as the epoxy resin curing agent. The curing agent has low viscosity, good compatibility with epoxy resin, long usable life, high bonding strength, and good flexible and heat shock resistance, so that it is suitable for the epoxy mortar material capable of absorbing the stress. Furthermore, the silicone adhesive is made into the sealing waterstop band, so that the present invention has good water resistant performance; the color of the expansion joint structure is the same as that of the adjacent concrete or asphalt, so that the bridge has beautiful appearance; the expansion joint structure has no tremors while vehicles passing through, noise generated by vehicle driving is lower.

9 Claims, 1 Drawing Sheet

(56) References Cited

U.S. PATENT DOCUMENTS 6,668,412 B1 * 12/2003 Tadros .................. E01D 19/125
  14/73
6,825,444 B1 * 11/2004 Tuan ..................... E01C 11/265
  14/73

* cited by examiner

EPOXY MORTAR ADAPTED IN BRIDGE EXPANSION JOINT AND CONSTRUCTION METHOD THEREOF

CROSS REFERENCE OF RELATED APPLICATION

The present invention claims priority under 35 U.S.C. 119(a-d) to CN 201510946447.2, filed Dec. 17, 2015.

BACKGROUND OF THE PRESENT INVENTION

Field of Invention

The present invention relates to an epoxy mortar material for a bridge expansion joint structure and a construction method thereof, which belongs to a technical field of building materials.

Description of Related Arts

The bridge expansion joint structure is an important part of bridge engineering. Its construction technology is a very critical process in bridge construction and a very important part which affects the quality of the bridge. The quality of the joint structure has an impact on the overall bridge connection, and causes a great impact on vehicles and car jumping, thereby resulting in traffic accidents.

Currently, during the construction of the bridge expansion joint structure, it is needed for pre-embedded reinforcements to be set, prefabricated steel sections and pre-embedded reinforcements are welded with each other, and then the cement concrete is poured into the grooves at two sides of the bridge expansion joint structure. The intrinsic structural strength of the bridge expansion joint structure is low and easy to be affected by outside temperature changes and concrete shrinkage; and the deformation of the bridge deck produces a greater stress at the expansion joint structure, due to the concrete belongs to the rigid material, the expansion joint structure is easy to be damaged. Simultaneously, due to long curing time and hard removing of the concrete, the construction of the damaged expansion joint structure is complicated and time-consuming.

China Patent CN103387353A, published on Nov. 13, 2013 and titled as "Flexible concrete for rapidly repairing expansion joint structure", provides a flexible concrete for rapidly repairing an expansion joint structure, wherein: the flexible concrete comprises raw materials A, B and C with a mass ratio of 1:(1-2.5):(8-18); the raw material A is isocyanate or pre-polymer; an ingredient of the raw material B comprises polyhydric alcohol, plasticizer, chain extender, catalyst, filler, antioxidant, defoamer, coupling agent and pigment with a mass ratio of (100-105):(4-30):(5-20):(0.01-1):(20-100):(0-3):(0-3):(0-30):(0-20); an ingredient of the raw material C comprises aggregate. Difference between the above China Patent and the present invention are as follows.

(1) The ingredient of the raw material A is isocyanate or pre-polymers thereof.

(2) The ingredient of the raw material B comprises polyhydric alcohol, plasticizer, chain extender, catalyst, filler, antioxidant, defoamer, coupling agent and pigment with a mass ratio of (100-105):(4-30):(5-20):(0.01-1):(20-100):(0-3):(0-3):(0-30):(0-20).

The isocyanate or pre-polymers thereof, adopted by the above China Patent, have severe toxicity and strong irritation; once contacting therewith, other materials except stainless steel, nickel, glass and ceramic have the risk of corrosion and produce exothermic reaction; furthermore, while being repairing, the expansion joint structure is easy to be affected on existing material performances, and health hazards are brought to construction workers.

China Patent CN103964748A, published on Aug. 6, 2014 and titled as "Rapid repairing material for expansion joint structure and preparation method thereof", provides a rapid repairing material for an expansion joint structure and a preparation method thereof, wherein: the rapid repairing material comprises components A, B and C; an ingredient of the component A comprises epoxy resin, reactive diluent and filler with a mass ratio of 100:(10-30):(5-40); an ingredient of the component B comprises curing agent and ultraviolet absorber with a mass ratio of (50-100):(0.1-3); an ingredient of the component C comprises aggregate; a mass ratio range of the component C to a sum of the components A and B is (3:1)-(8:1). Raw materials of the components A, B and C are respectively as follows.

(1) The reactive diluent is cardanol glycidyl ether.
(2) The filler is diatomaceous earth or activated silicon powders.
(3) The curing agent is phenolic amine.
(4) The ultraviolet absorber is the benzotriazole compound.
(5) The aggregate is the high-temperature calcined wear-resistant stone with a particle size of 0.6 mm-3.3 mm.

The above China Patent adopts the phenolic amine curing agent which has big brittleness; the flexibility of the rapid repairing material, provided by the above China Patent, is only adjusted by the reactive diluent cardanol glycidyl ether; the use of less reactive diluent results in insufficient flexibility of the rapid repairing material, and the use of more reactive diluent results in low bond strength thereof, so that the curing time thereof is increased, thus the rapid repairing material is not suitable for practical application.

China Patent CN103980584A, titled as "Pouring material for bridge expansion joint transition zone and its preparation method and construction technology", discloses a pouring material for a bridge expansion joint transition zone and its preparation method and construction technology, wherein: the pouring material comprises components A, B and C; an ingredient of the component A comprises epoxy resin, epoxy reactive diluent, superfine waste rubber powders, defoamer, and dispersant with a mass ratio of 100:(0-20):(10-50):(0.1-0.3):(0.1-0.3); an ingredient of the component B comprises curing agent, curing catalyst, and coupling agent with a mass ratio of 100:(0-10):(0.5-2); an ingredient of the component C comprises waste rubber particles, waste rubber powders and whiskers with a mass ratio of 100:(200-400):(10-30). Differences between the above China Patent and the present invention are as follows.

(1) The curing agent is one or more members selected from a group consisting of polyamide, fatty amine, alicyclic amine, aromatic amine, phenolic amine and modified products thereof;

(2) Black rubber particles and black rubber powders are adopted;

(3) Calcium sulfate whiskers with an average diameter of 1-8 μm and an average length of 50-200 μm are adopted.

The curing agent in the above China Patent, is one or more members selected from a group consisting of polyamide, fatty amine, alicyclic amine, aromatic amine, phenolic amine and modified products thereof, the curing agent has large brittleness and is easy to be cracked; the filler is mainly the black rubber particles and the black rubber powders, in spite that the rubber has a certain flexible for absorbing impact stress to a certain extent, the filler has low hardness, is easy to aging and not wear resistant; the pouring material, provided by the present invention, is directly poured into an installation position of the original expansion joint structure for forming a seamless expansion joint structure. The seamless expansion joint structure is an absolute elastic body, brittle and poor in impact resistance; after being used for a long time, it forms a bump, thereby bring inconveniences to passing vehicles.

Furthermore, the whiskers in the filler have the average diameter of 1-8 μm and the average length of 50-200 μm. Because the particles are very small, the mixed rubber solution is not easy to bond with the rubber, so that it is prone to result in uneven local mixing. In conclusion, the pouring material provided by the above China Patent has unstable material performance and short service life, and still needs to be improved and perfected in the actual use.

SUMMARY OF THE PRESENT INVENTION

Aiming at the above mentioned problems, an object of the present invention is to overcome the above shortcomings and provide an epoxy mortar material for a bridge expansion joint structure and a construction method thereof, which has strong strength, simple construction technology, short maintenance time, and long service life. To achieve the above object, the present invention adopts technical solutions as follows.

An epoxy mortar material for a bridge expansion joint structure comprises a liquid A, a liquid B and a filler, wherein:

an ingredient of the liquid A comprises bisphenol A-type E-51 epoxy resin, 12-14 alkyl glycidyl ether, and CYH-277 with a mass ratio of 90:10:(10-15);

an ingredient of the liquid B comprises curing agent, accelerant, coupling agent, and nonyl phenol with a mass ratio of (25-30):(1-3):(3-5):(50-70);

a mass ratio of the liquid A, the liquid B and the filler is 1:1:8;

an ingredient of the curing agent by mass percentage comprises 40% D230 and 60% D2000;

the accelerant is K54 or DMP-30;

the coupling agent is KH-560;

the filler is a continuous assembled basalt or slag with a Mohs hardness larger than 5 and a particle size of 0.5-15 mm.

The bridge expansion joint structure comprises adjoining bridge deck pavement layers, bridge deck bases, and a polystyrene foam board, wherein: the polystyrene foam board is clamped within an interval between two adjacent bridge deck bases, the adjoining bridge deck pavement layers are respectively paved on the bridge deck bases, two strip-shaped grooves are respectively provided between two adjacent adjoining bridge deck pavement layers and the polystyrene foam board, the epoxy mortar material is poured into the strip-shaped grooves.

Preferably, a height of epoxy mortar layers formed by pouring the epoxy mortar material is equal to that of the adjoining bridge deck pavement layers, and is higher than that of the polystyrene foam board, an expansible gap is formed between two adjacent epoxy mortar layers and the polystyrene foam board.

Preferably, the two adjacent epoxy mortar layers have two arched chamfers, each of which having an angle of 45°, at two ends of an opening of the expansible gap, respectively.

Preferably, the bridge expansion joint structure further comprises a flexible sealing waterstop band which is filled within the expansible gap between the two adjacent epoxy mortar layers, and a height of the flexible sealing waterstop band is lower than that of the epoxy mortar layers.

The present invention also provided a construction method of an epoxy mortar material for a bridge expansion joint structure comprising steps of:

S1: pre-treating an expansible gap which comprises: removing all debris and powders within the expansible gap by cleaning pre-treating an installation position of the expansible gap on bridge deck pavement layers and bridge deck bases;

S2: a polystyrene foam board filling and molding which is specifically filling and molding by putting a polystyrene foam board into the expansible gap;

S3: mixing an epoxy mortar material which comprises preparing the epoxy mortar material by mixing a liquid A, a liquid B and a filler with a mass ratio of 1:1:8, and pouring the prepared epoxy mortar material into strip-shaped grooves respectively provided between the adjoining bridge deck pavement layers and the polystyrene foam board;

S4: leveling a flexible sealing waterstop band which comprises: after solidifying the epoxy mortar material, filling silicone adhesive with an initial state of fluid on the polystyrene foam board, solidifying the silicone adhesive, and then leveling and forming the flexible sealing waterstop band on the polystyrene foam board and between two adjacent epoxy mortar layers; and S5: chamfering the epoxy mortar layers which are specifically chamfering the solidified and formed epoxy mortar layers.

Preferably, in the S3, a height of the epoxy mortar layers formed by pouring the epoxy mortar material is equal to that of the adjoining bridge deck pavement layers, and is higher than that of the polystyrene foam board, the expansible gap is formed between two adjacent epoxy mortar layers and the polystyrene foam board.

Preferably, in the S4, the flexible sealing waterstop band is filled within the expansible gap between the two adjacent epoxy mortar layers, and a height of the flexible sealing waterstop band is lower than that of the epoxy mortar layers.

Preferably, in the S5, the two adjacent epoxy mortar layers have two arched chamfers, each of which having an angle of 45°, at two ends of an opening of the expansible gap, respectively.

By adopting the above technical solutions, the present invention has advantages as follows.

Diamines D2000 and D230 are mixed to act the epoxy resin curing agent. The curing agent has low viscosity, good compatibility with epoxy resin, long usable life, high bonding strength, and good flexible and heat shock resistance, so that it is suitable for the epoxy mortar material capable of absorbing the stress. While the construction of the bridge expansion joint structure, due to the epoxy mortar material formed by mixing the liquid A, the liquid B and the filler has a certain flexible and is able to absorb the impact stress; the situation, that the steel section is adopted in traditional bridge expansion joint structure to protect the easily damaged rigid concrete under the impact stress, is changed; instead of traditional rigid concrete in the expansion joint structure, the flexible epoxy mortar material is able to absorb a part of stresses, has impact resistance, excellent usage performance and durability, and is able to replace the steel section structure, so that a large amount of welding in the traditional expansion joint technologies are avoided. Furthermore, the silicone adhesive is made into the sealing waterstop band, so that the present invention has good water resistant performance; the color of the expansion joint structure is the same as that of the adjacent concrete or asphalt, so that the bridge has beautiful appearance; the expansion joint structure has no tremors while vehicles passing through, noise generated by vehicle driving is lower.

The combination of the curing agent and the basalt or slag filler, provided by the present invention, not only has the flexibility of the curing agent, but also has the rigidity of the filler. After mixing and bonding the curing agent and the basalt or slag filler, the present invention is able to not only absorb the impact stress, but also ensure enough rigidity; simultaneously, the filler has a particle size of 0.5-15 mm, which allows the liquid A, the liquid B and the filler to mix more evenly and bond more closely. The mortar material, provided by the present invention, has stable performance, is durable and low in cost; is able to not only partially repair but integrally synthesize to convenient for post maintenance, so that it is very suitable for practical engineering work.

These and other objectives, features, and advantages of the present invention will become apparent from the following detailed description, the accompanying drawings, and the appended claims.

Component symbols are explained as follows:
1: bridge deck pavement layer; 2: epoxy mortar layer; 3: polystyrene foam board; 4: waterstop band; 5: bridge deck base.

DETAILED DESCRIPTION OF THE PREFERRED EMBODIMENT

To be more clearly understood, the present invention is further explained with accompanying drawings and embodiments in detail.

Figure 1:
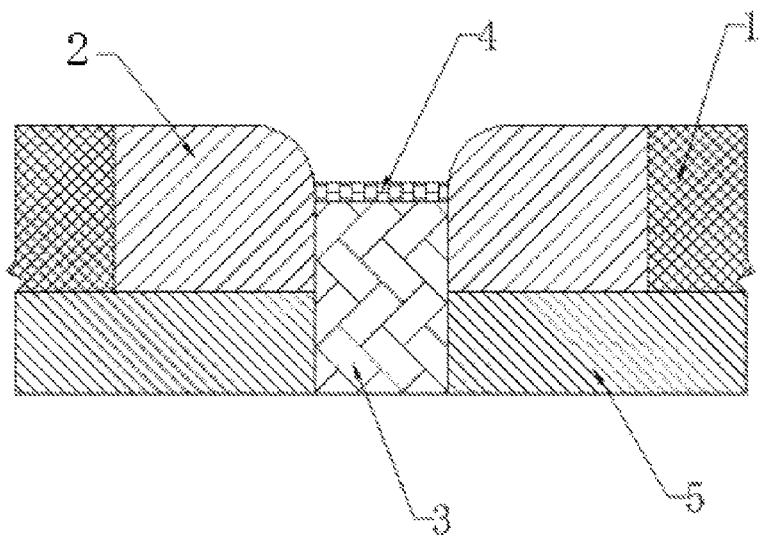
FIG. 1 is a construction flow chart of an epoxy mortar material according to a preferred embodiment of the present invention.

Referring to FIG. 1, a bridge expansion joint structure, provided by the present invention, comprises an adjoining bridge deck pavement layers 1, bridge deck bases 5, and a polystyrene foam board 3, wherein: the polystyrene foam board 3 is clamped within an interval of two adjacent bridge deck bases 5, the adjoining bridge deck pavement layers 1 are respectively paved on the bridge deck bases 5, two strip-shaped grooves are respectively provided between two adjacent adjoining bridge deck pavement layers 1 and the polystyrene foam board 3, the epoxy mortar material is poured into the strip-shaped grooves.

In this preferred embodiment, a height of the epoxy mortar layers 2 formed by pouring the epoxy mortar material is equal to that of the adjoining bridge deck pavement layers 1, and is higher than that of the polystyrene foam board 3, an expansible gap is formed between two adjacent epoxy mortar layers 2 and the polystyrene foam board 3.

In this preferred embodiment, the two adjacent epoxy mortar layers 2 have two arched chamfers, each of which having an angle of 45°, at two ends of an opening of the expansible gap, respectively.

In this preferred embodiment, the bridge expansion joint structure further comprises a flexible sealing waterstop band 4 which is filled within the expansible gap between the two adjacent epoxy mortar layers 2, and a height of the flexible sealing waterstop band 4 is lower than that of the epoxy mortar layers 2.

Figure 2:
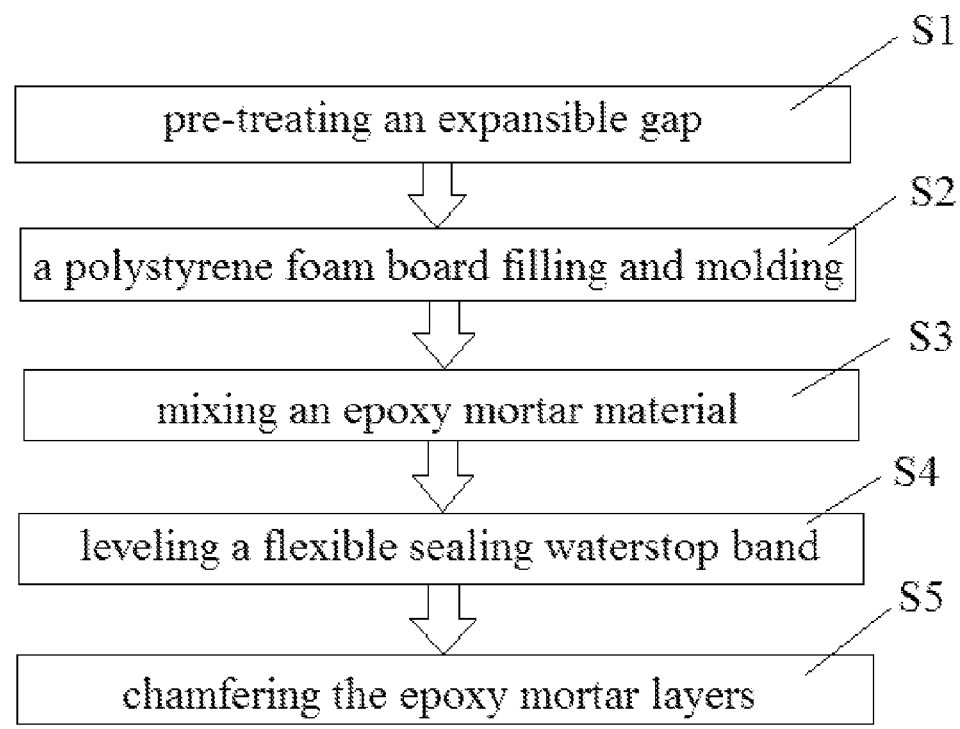
FIG. 2 is a sectional view of a bridge expansion joint structure according to the preferred embodiment of the present invention.

Referring to FIG. 2, a construction method of an epoxy mortar material for a bridge expansion joint structure comprises steps of:

S1: pre-treating an expansible gap which comprises: removing all debris and powders within the expansible gap by cleaning pre-treating an installation position of the expansible gap on bridge deck pavement layers 1 and bridge deck bases 5;

S2: a polystyrene foam board filling and molding which is specifically filling and molding by putting a polystyrene foam board 3 into the expansible gap;

S3: mixing an epoxy mortar material which comprises preparing the epoxy mortar material by mixing a liquid A, a liquid B and a filler with a mass ratio of 1:1:8, and pouring the prepared epoxy mortar material into strip-shaped grooves respectively provided between the adjoining bridge deck pavement layers 1 and the polystyrene foam board 3;

S4: leveling a flexible sealing waterstop band 4 which comprises: after solidifying the epoxy mortar material, filling silicone adhesive with an initial state of fluid on the polystyrene foam board 3, solidifying the silicone adhesive, and then leveling and forming the flexible sealing waterstop band 4 on the polystyrene foam board 3 and between two adjacent epoxy mortar layers 2; and S5: chamfering the epoxy mortar layers 2 which are specifically chamfering the solidified and formed epoxy mortar layers 2.

Embodiment 1

An epoxy mortar material for a bridge expansion joint structure, provided by the present invention, comprises a liquid A, a liquid B and a filler, wherein: raw materials of the liquid A and the liquid B are respectively mixed, and then stirred for 20 minutes in a mixing tank at room temperature for respectively forming the liquid A and the liquid B; during a construction process of the bridge expansion joint structure; the liquid A, the liquid B and the filler are mixed with a mass ratio of 1:1:8 to form the epoxy mortar material;

wherein: the liquid A comprises components in weight parts of: 90 parts of epoxy resin E51, 10 parts of 12-14 alkyl glycidyl ether and 10 parts of CYH-277, here, the CYH-277 is an epoxy resin toughening and diluting agent which is commercially available in China, and has multi-reactive functional groups, a dendritic molecular structure and multiple cavities therein;

the liquid B comprises components in weight parts of: 25 parts of a mixture comprising 40% D230 and 60% D2000, 3 parts of accelerant K54, 5 parts of KH-560, and 50 parts of nonyl phenol;

the filler is 772 parts of a continuous assembled basalt with a Mohs hardness larger than 5 and a particle size of 0.5-15 mm.

Embodiment 2

An epoxy mortar material for a bridge expansion joint structure, provided by the present invention, comprises a liquid A, a liquid B and a filler, wherein: raw materials of the liquid A and the liquid B are respectively mixed, and then stirred for 20 minutes in a mixing tank at room temperature for respectively forming the liquid A and the liquid B; during a construction process of the bridge expansion joint structure, the liquid A, the liquid B and the filler are mixed with a mass ratio of 1:1:8 to form the epoxy mortar material;

wherein: the liquid A comprises components in weight parts of: 90 parts of epoxy resin E51, 10 parts of 12-14 alkyl glycidyl ether and 15 parts of CYH-277, here, the CYH-277 is an epoxy resin toughening and diluting agent which is commercially available in China, and has multi-reactive functional groups, a dendritic molecular structure and multiple cavities therein;

the liquid B comprises components in weight parts of: 28 parts of a mixture comprising 40% D230 and 60% D2000, 2 parts of accelerant DMP-30, 4 parts of KH-560, and 60 parts of nonyl phenol;

the filler is 836 parts of a continuous assembled basalt with a Mohs hardness larger than 5 and a particle size of 0.5-15 mm.

Embodiment 3

An epoxy mortar material for a bridge expansion joint structure, provided by the present invention, comprises a liquid A, a liquid B and a filler, wherein: raw materials of the liquid A and the liquid B are respectively mixed, and then stirred for 20 minutes in a mixing tank at room temperature for respectively forming the liquid A and the liquid B; during a construction process of the bridge expansion joint structure, the liquid A, the liquid B and the filler are mixed with a mass ratio of 1:1:8 to form the epoxy mortar material;

wherein: the liquid A comprises components in weight parts of: 90 parts of epoxy resin E51, 10 parts of 12-14 alkyl glycidyl ether and 12 parts of CYH-277, here, the CYH-277 is an epoxy resin toughening and diluting agent which is commercially available in China, and has multi-reactive functional groups, a dendritic molecular structure and multiple cavities therein;

an ingredient of the liquid B comprises components in weight parts of: 30 parts of a mixture comprising 40% D230 and 60% D2000, 1 part of accelerant K54, 3 parts of KH-560, and 70 parts of nonyl phenol;

the filler is 864 parts of a continuous assembled slag with a Mohs hardness larger than 5 and a particle size of 0.5-15 mm.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An epoxy mortar material for a bridge expansion joint structure comprising a first liquid, a second liquid and a filler, wherein:
   an ingredient of the first liquid comprises bisphenol A-type E-51 epoxy resin, 12-14 alkyl glycidyl ether, and an epoxy resin toughening and diluting agent with a mass ratio of 90:10:(10-15);
   an ingredient of the second liquid comprises curing agent, accelerant, coupling agent, and nonyl phenol with a mass ratio of (25-30):(1-3):(3-5):(50-70);
   a mass ratio of the first liquid, the second liquid and the filler is 1:1:8;
   the epoxy resin toughening and diluting agent is CYH-277;
   an ingredient of the curing agent by mass percentage comprises 40% D230 and 60% D2000;
   the accelerant is K54 or DMP-30;
   the coupling agent is KH-560;
   the filler is a continuous assembled basalt or slag with a Mohs hardness larger than 5 and a particle size of 0.5-15 mm.

2. The epoxy mortar material for the bridge expansion joint structure, as recited in claim 1, wherein the bridge expansion joint structure comprises adjoining bridge deck pavement layers, bridge deck bases, and a polystyrene foam board, wherein: the polystyrene foam board is clamped within an interval between two adjacent bridge deck bases, the adjoining bridge deck pavement layers are respectively paved on the bridge deck bases, two strip-shaped grooves are respectively provided between two adjacent adjoining bridge deck pavement layers and the polystyrene foam board, the epoxy mortar material is poured into the strip-shaped grooves.

3. The epoxy mortar material for the bridge expansion joint structure, as recited in claim 2, wherein: a height of epoxy mortar layers formed by pouring the epoxy mortar material is equal to that of the adjoining bridge deck pavement layers, and is higher than that of the polystyrene foam board, an expansible gap is formed between two adjacent epoxy mortar layers and the polystyrene foam board.

4. The epoxy mortar material for the bridge expansion joint structure, as recited in claim 3, wherein: the two adjacent epoxy mortar layers have two arched chamfers, each of which having an angle of 45°, at two ends of an opening of the expansible gap, respectively.

5. The epoxy mortar material for the bridge expansion joint structure, as recited in claim 1, wherein: the bridge expansion joint structure further comprises a flexible sealing waterstop band which is filled within the expansible gap between the two adjacent epoxy mortar layers, and a height of the flexible sealing waterstop band is lower than that of the epoxy mortar layers.

6. A construction method of an epoxy mortar material for a bridge expansion joint structure, wherein the epoxy mortar material comprises a first liquid, a second liquid and a filler;
   an ingredient of the first liquid comprises bisphenol A-type E-51 epoxy resin 12-14 alkyl glycidyl ether, and an epoxy resin toughening and diluting agent with a mass ratio of 90:10:(10-15);
   an ingredient of the second liquid comprises curing agent, accelerant, coupling agent, and nonyl phenol with a mass ratio of (25-30):(1-3):(3-5):(50-70);
   a mass ratio of the first liquid, the second liquid and the filler is 1:1:8;
   the epoxy resin toughening and diluting agent is CYH-277;
   an ingredient of the curing agent by mass percentage comprises 40% D230 and 60% D2000;
   the accelerant is K54 or DMP-30;
   the coupling agent is KH-560;
   the filler is a continuous assembled basalt or slag with a Mohs hardness larger than 5 and a particle size of 0.5-15 mm;
   the construction method comprising steps of:
   S1: pre-treating an expansible gap which comprises: removing all debris and powders within the expansible gap by cleaning pre-treating an installation position of the expansible gap on bridge deck pavement layers and bridge deck bases;
   S2: a polystyrene foam board filling and molding which is specifically filling and molding by putting a polystyrene foam board into the expansible gap;

S3: pouring the epoxy mortar material into strip-shaped grooves respectively provided between the adjoining bridge deck pavement layers and the polystyrene foam board;

S4: leveling a flexible sealing waterstop band which comprises: after solidifying the epoxy mortar material, filling silicone adhesive with an initial state of fluid on the polystyrene foam board, solidifying the silicone adhesive, and then leveling and forming the flexible sealing waterstop band on the polystyrene foam board and between two adjacent epoxy mortar layers; and S5: chamfering the epoxy mortar layers which are specifically chamfering the solidified and formed epoxy mortar layers.

7. The construction method of the epoxy mortar material for the bridge expansion joint structure, as recited in claim 6, wherein: in the S3, a height of the epoxy mortar layers formed by pouring the epoxy mortar material is equal to that of the adjoining bridge deck pavement layers, and is higher than that of the polystyrene foam board, the expansible gap is formed between two adjacent epoxy mortar layers and the polystyrene foam board.

8. The construction method of the epoxy mortar material for the bridge expansion joint structure, as recited in claim 7, wherein: in the S4, the flexible sealing waterstop band is filled within the expansible gap between the two adjacent epoxy mortar layers, and a height of the flexible sealing waterstop band is lower than that of the epoxy mortar layers.

9. The construction method of the epoxy mortar material for the bridge expansion joint structure, as recited in claim 8, wherein: in the S5, the two adjacent epoxy mortar layers have two arched chamfers, each of which having an angle of 45°, at two ends of an opening of the expansible gap, respectively.

* * * * *

UNITED STATES PATENT AND TRADEMARK OFFICE
CERTIFICATE OF CORRECTION

PATENT NO. : 9,822,499 B2
APPLICATION NO. : 15/294652
DATED : November 21, 2017
INVENTOR(S) : Wen Yan et al.

Page 1 of 1

It is certified that error appears in the above-identified patent and that said Letters Patent is hereby corrected as shown below:

On the Title Page

Below item (65) insert:
--(30) Foreign Application Priority Data
Oct. 14, 2015 (CN)---------201510662663.4
Dec. 17, 2015 (CN)---------201510946647.2--

Signed and Sealed this
First Day of May, 2018

Andrei Iancu
*Director of the United States Patent and Trademark Office*